United States Patent [19]

Mitchell et al.

[11] 4,160,692
[45] Jul. 10, 1979

[54] WIPED FILM EVAPORATORS

[75] Inventors: James Mitchell; Thomas N. Pye, both of Leven, Scotland

[73] Assignee: Henry Balfour & Company Limited, Fife, Scotland

[21] Appl. No.: 817,003

[22] Filed: Jul. 18, 1977

[30] Foreign Application Priority Data

Dec. 10, 1976 [GB] United Kingdom ............... 51576/76

[51] Int. Cl.² .............................................. B01D 1/22
[52] U.S. Cl. ................... 159/6 W; 159/13 A; 159/DIG. 15
[58] Field of Search ............. 159/6 W, 6 H, DIG. 15

[56] References Cited

U.S. PATENT DOCUMENTS

| | | | |
|---|---|---|---|
| 2,955,990 | 10/1960 | Smith | 159/6 W |
| 2,974,725 | 3/1961 | Samesreuther et al. | 159/6 W |
| 2,993,842 | 7/1961 | Smith | 159/6 W |
| 3,199,574 | 8/1965 | Keller | 159/6 W |
| 3,216,042 | 11/1965 | Strittmatter | 159/6 W |
| 3,266,555 | 8/1966 | Thier | 159/6 W |
| 3,382,158 | 5/1968 | Smith | 159/DIG. 15 |
| 3,770,592 | 10/1973 | Noirot | 159/DIG. 15 |
| 4,017,354 | 4/1977 | Marchenko et al. | 159/6 R |

*Primary Examiner*—Norman Yudkoff

*Attorney, Agent, or Firm*—Mason, Fenwick & Lawrence

[57] ABSTRACT

A thin wiped-film evaporator comprises an upright cylindrical vessel with a vertical rotor shaft extending concentrically within the vessel. An inlet pipe supplies liquid to be evaporated to a distributor which spreads the liquid around the inner wall of the vessel, and a series of wiper assemblies carried by the rotor shaft below the distributor serve for the creation of a thin liquid film on the vessel's inner wall, heating means being provided to evaporate the liquid film. The evaporator includes a vapor inlet and a liquid discharge.

To enable the evaporator to handle corrosive liquids or products, the internal surface of the vessel is corrosion resistant as are the other parts within the evaporator. In particular, the vessel's inner wall and the rotor shaft are glass (or enamel) lined and additionally at least part of each wiper assembly can be glassed: the other internal parts can be of fluorocarbon. This arrangement enables the evaporator to satisfactorily handle high temperature materials, and is also conducive to greater purity and longer evaporator life. Each wiper assembly includes an axial series of radial finger elements pivotally carried by a spindle: such an assembly satisfactorily caters for out-of-roundness and straightness irregularities in the vessel.

16 Claims, 9 Drawing Figures

WIPED FILM EVAPORATORS

BACKGROUND OF THE INVENTION

The present invention relates to wiped-film evaporators, and especially to such evaporators for use with corrosive liquids.

In one known form of wiped-film evaporator a thin film of liquid to be evaporated is formed on the internal wall of an upright cylindrical evaporation vessel by means of wiping elements carried by a rotary vertical shaft in the vessel, and heating means cause evaporation of the film. Such an evaporator is shown in British Pat. No. 1288431 (Henry Balfour & Co. Limited). The wiping elements provide a rapidly changing film by fluid friction, and good heat transfer rates are maintained over the entire length of the evaporator because the wiper elements effectively wipe the entire heating surface irrespective of the film thickness. Dry spots and channelling are eliminated and nucleate (bubble) boiling is substantially reduced thus minimising high localised heat fluxes into the process liquor which, with heat sensitive chemicals and foodstuffs, can be detrimental to quality, taste and flavour. The wiped film evaporator can be used for evaporation of organic compounds, concentration of aqueous solutions, solvent recovery, stripping of aqueous solutions, and concentration of viscous products.

To enable the evaporator to handle corrosive liquids, it has been customary to use alloys, such as for example stainless steel, for parts of the evaporator coming into contact with the corrosive liquids and/or products of the process. Such parts include the vessel, shaft and wiping element support means: the wiping elements themselves can be made of a plastics material. However, the manufacture of parts from alloys is relatively expensive and further alloy parts are not completely satisfactory for some processes, for example those operating at higher temperature, those with higher purity requirements and those dealing with more corrosive liquid or products. In particular, the alloy parts could contaminate the product, and cleaning may be difficult.

Additionally, it has been customary to have the bottom bearing for the shaft located within the evaporator vessel, and supported from the vessel wall for example by means of radial struts. For processes involving corrosive liquids, the life of the bottom bearing will be greatly reduced, and although removable cartridge type bearings have been employed to facilitate bearing maintenance or replacement, this complicates the evaporator construction.

SUMMARY OF THE INVENTION

It is an object of the present invention to provide a wiped-film evaporator which is economical to produce and operate.

It is a further object of this invention to provide an evaporator which is suitable for treating liquids at increased temperatures, and/or liquids or products of a particularly corrosive nature, and for processes with high purity requirements.

It is yet a further object of the present invention to provide a wiping assembly which satisfactorily caters for irregularities in the roundness and straightness of the vessel internal wall portion wiped by the wiping elements.

The evaporator provided by this invention comprises a vertically oriented cylindrical vessel having its inner surface of corrosion resistant material; rotary shaft means within the vessel supported in bearing means and connectible to a drive, said rotary shaft means having a corrosion resistant glass lining thereon; an inlet for delivery of liquid to be evaporated into the cylindrical vessel; an outlet for vapour; and corrosion resistant wiping means carried by the rotary shaft means to wipe the internal wall surface of the cylindrical vessel for the formation of a liquid film on said internal surface, at least part of the corrosion resistant wiping means having a corrosion resistant glass lining thereon.

Additionally the evaporator provided in this invention comprises a vertically oriented cylindrical evaporation vessel; rotary shaft means within the vessel and supported by bearing means located outwith the vessel with one end of the shaft means free within the vessel; an inlet for delivery of liquid to be evaporated into the cylindrical vessel; an outlet for vapour; and wiping means carried by the rotary shaft means for wiping the internal surface of the cylindrical vessel for the formation of a liquid film on said internal surface, said wiping means including a wiper assembly comprising an axial series of wiper elements individually pivotal on a rod member, the wiper elements being engageable with the internal surface of the vessel so as to have a trailing configuration to cater for irregularities in the roundness and straightness of the portion of said internal surface wiped by the wiping means.

In the present specification and appended claims the term "glassing" or "glass lining" covers the bonding of a vitreous or partially devitrified inorganic coating to a metallic substrate at a suitable elevated temperature.

Other objects and advantages of the present invention will be apparent from the following description.

DETAILED DESCRIPTION

Figure 1:
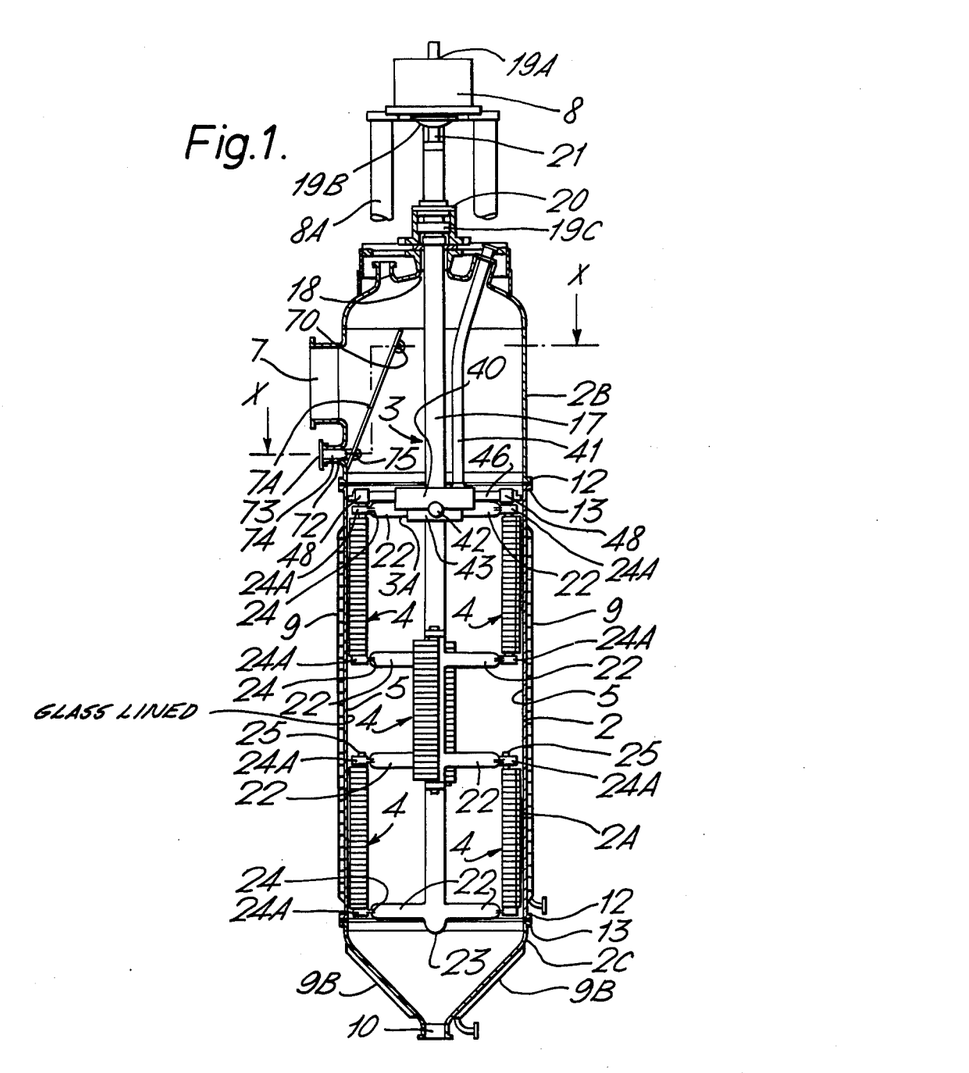
FIG. 1 is a cross-sectional elevational view of a wiped-film evaporator according to one embodiment of the present invention.

Referring to FIG. 1, a wiped-film evaporator 1 for use in handling corrosive liquids in chemical processes comprises a cylindrical steel vessel, housing a rotor assembly 3, a drive unit 8 for the rotor assembly 3, wiper blade assemblies 4 carried by the rotor assembly 3 for the formation of a liquid film on the inner wall 5 of the vessel 2, an inlet feed system 6 (which will be described in greater detail below) for liquid to be evaporated delivering on to the inner wall 5, an outlet 7 for vapour, a heating jacket 9 for the vessel, and a discharge 10 for non-vaporised products. The wiper blade assemblies 4 are axially and circumferentially staggered for complete and effective wiping of a lower portion of the wall 5 adjacent the jacket 9. As can be seen in FIG. 1, the wiper assemblies 4 extend above the zone of the heating jacket 9 so that the liquid film is formed on the wall by the assemblies 4 prior to the heating zone.

Figures 6, 7:
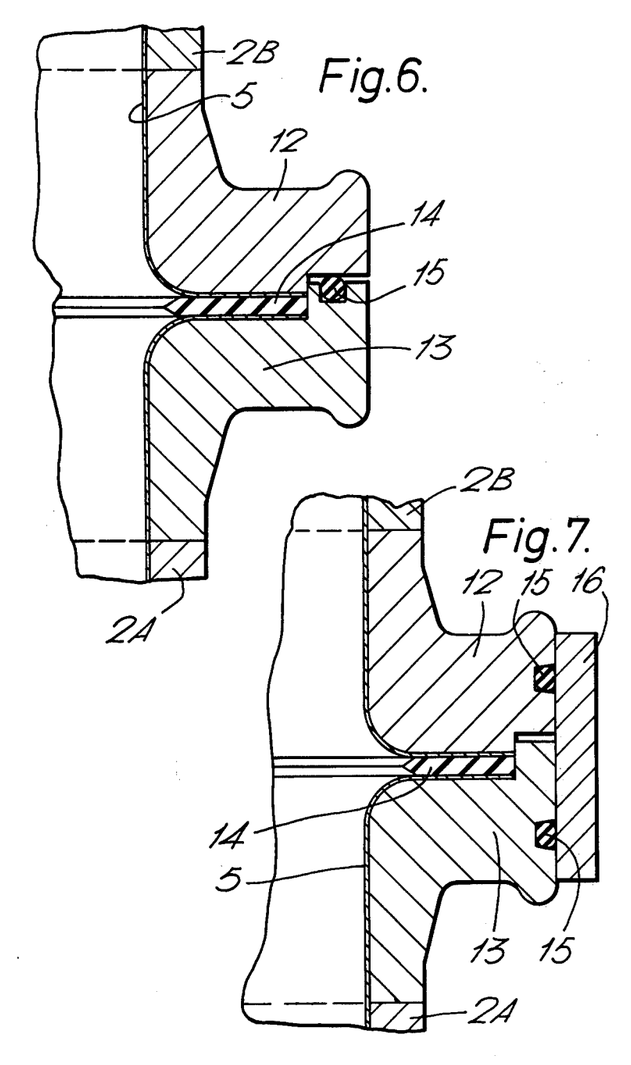
FIGS. 6 and 7 show various forms of sealing connection between the parts of the evaporator vessel.
Figure 8:
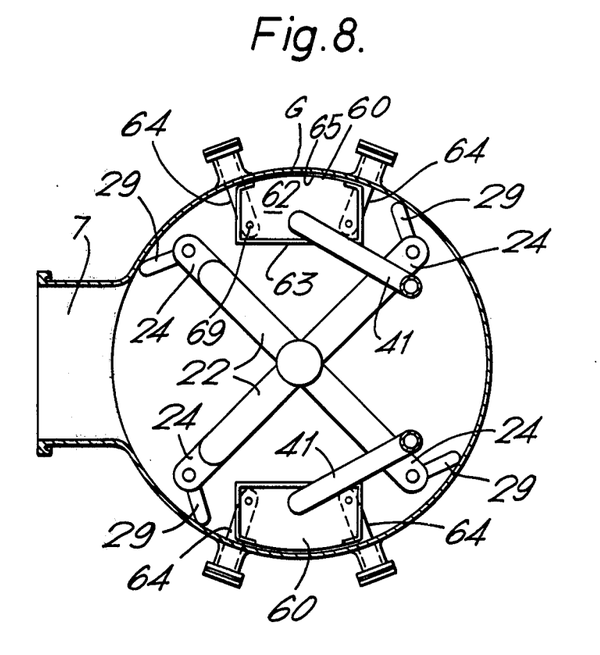
FIG. 8 shows a cross-sectional plan view of the evaporator along line B—B in FIG. 1 but with a modified liquid distribution system.

The vessel 2 is located vertically and comprises main elongate cylindrical portion 2A, a domed top cap 2B and a generally frusto-conical bottom 2C. The vessel 2 is intended for operation under vacuum (e.g. 1 mm mercury abs) and the top cap 2B and bottom 2C are joined to the main portion 2A by peripheral air-tight connections 11 (two alternatives are shown in detail in FIGS. 6 and 7) each comprising annular flanges 12, 13 having axial male-and-female interfitting parts, a sealing gasket 14 and one or more sealing O-rings 15, the flanges being tightly coupled by clamping means (not shown). A peripheral sealing sleeve 16 for the flange interface can also be provided.

Figure 4:
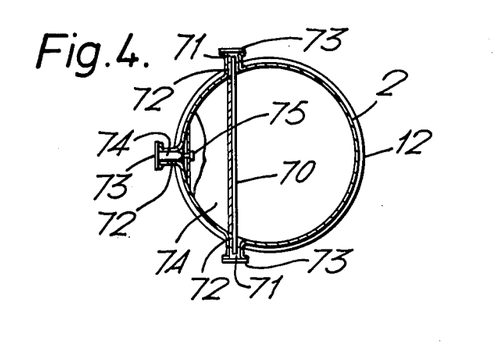
FIG. 4 is a plan view of the evaporator of FIG. 1 through section X—X in FIG. 1 and showing the mounting of the demister plate.

The inner wall 5 has a corrosion resistant glass lining thereon, which lining can be formed using conventional glassing techniques. 7A is a demister plate and a lower heating jacket 9B serves to maintain product outflow. Referring to FIG. 4, the plate 7A is supported by a lower P.T.F.E. stud 75 carried by glassed bar 74 removably located in a radical bore 72 of the vessel 2, and a glassed rod 70 extending between P.T.F.E. plugs 71 in opposed bores 72 serves for upper support of the plate 7A. Flange plates 73 close the outer ends of bores 72.

The rotor assembly 3 includes a shaft 17 which extends through an opening 18 of the vessel 2 and a coupling 21 connects the shaft 17 to the motor drive-unit 8 which is supported on cap 2B by means of stool 8A. Support bearings 19A, 19B in the drive unit 8 serve for axial support of the shaft 17, at least one bearing 19B being a radial thrust bearing, and the shaft 17 hangs in the vessel 2, with the lower end of the shaft 17 within the vessel 2. The upper end of the shaft 17 is journalled in a radial seal bearing 19C located in housing 20 and a corrosion resistant (ceramic) shaft seal is located at the vessel nozzle 18.

By virtue of the substantial axial spacing of the bearings 19A, 19B and 19C and by having the rotor assembly 3 constructed with suitable dimensions, the hung rotor 3 can be provided with suitable rigidity and freedom from excess lateral deflection to permit satisfactory operation of the rotor 3 and wiper assemblies 4. Consequently the normal internal lower bearing for the rotor assembly can be dispensed with and this greatly facilitates the provision of an evaporator suitable for handling corrosive liquids since an internal bearing is subject to rapid wear due to the corrosive environment in the vessel.

Figure 2:
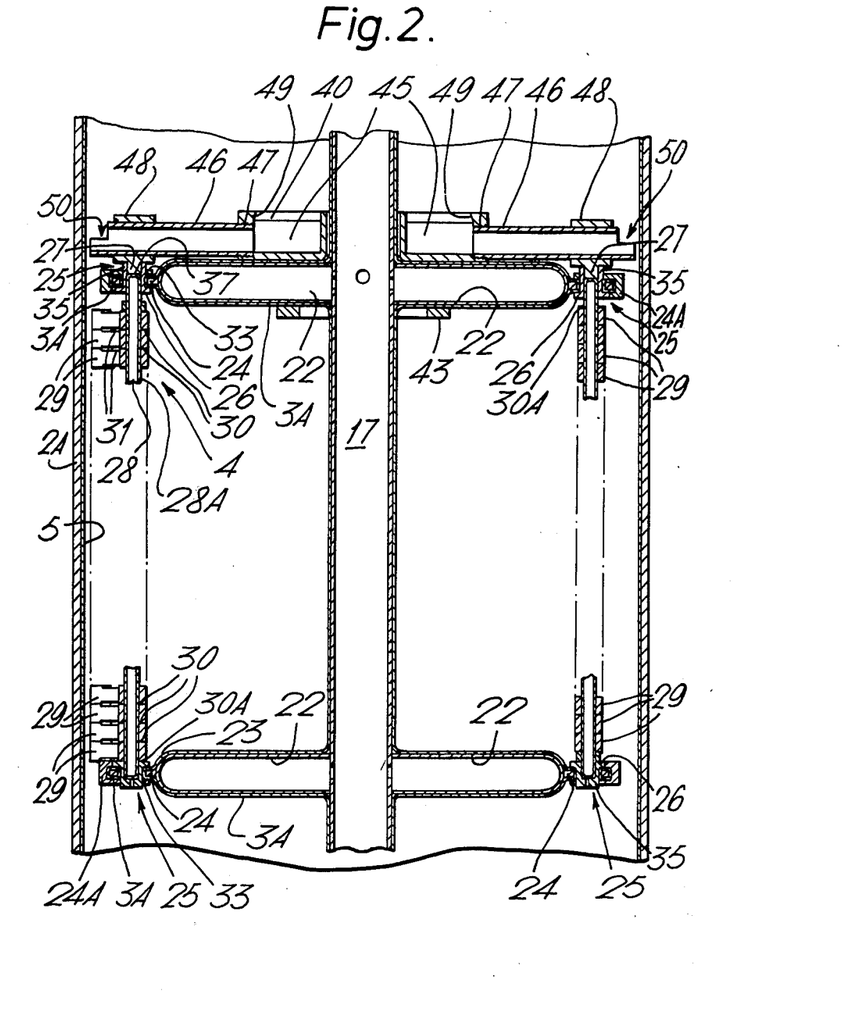
FIG. 2 is a cross-sectional elevational view of a detail of FIG. 1 to a larger scale.
Figure 3:
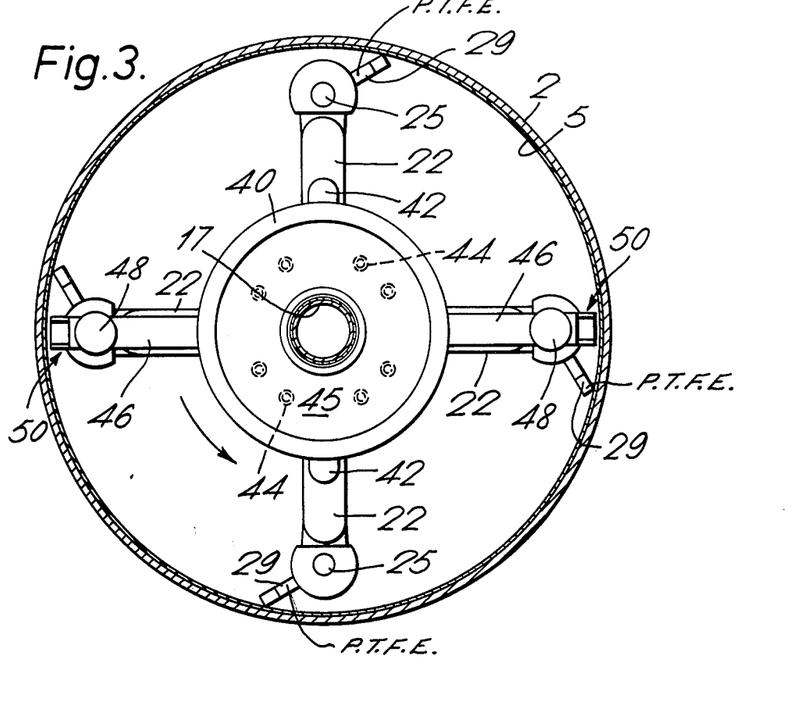
FIG. 3 is a plan view of the evaporator distributor of FIG. 2.

The rotor assembly 3 has an axial and circumferential series of radial arms 22 and this assembly 3 is glass lined (3A) to resist corrosive attack. It is a characteristic feature of this evaporator that all the edges of the rotor assembly 3 are substantially radiused 23; this permits satisfactory glassing of the rotor assembly. This glass lining 3A on the shaft 17 extends substantially to the upper end of the shaft 17, so that all portions of the rotor assembly 3 within the vessel 2 have a lining of corrosion resistant glass. A radially extending plate 24 (FIGS. 2 and 3) is welded to each straight arm 22 and has a removable fender ring 24A, the plate 24 including an axial through-bore 33. The glass linings 3A of arms 22 and plates 24 are shown in FIG. 2, and the substantial radiusing of the edges will be evident in this Figure. The through-bores 33 receive socket members 25 which include a tubular part 35 insertable into the bore 33 and a shouldered part 26 engageable with the plate 24 to locate the member 25. The members 25 are of glass filled P.T.F.E. and a blind bore 37 of each member 25 receives the respective end of wiper rod 28 of the wiper assemblies.

Each wiper assembly 4 comprises a steel wiper rod 28 having glass lining 28A, and an axial series of P.T.F.E. finger elements 29 pivotally carried by the rod 28, washers 30 serving to provide tip clearance (e.g., 1 mm) between successive elements 29. The tips of elements 29 are square ended and the side walls of each element 29 are recessed at 31 to provide greater clearance (4 to 5 mm) to resist any fouling between the elements. To fit a wiper assembly 3, the bore 37 of the top socket member 25 is in the open state (plug 27 removed) and the rod 28 is inserted through this top member 25. The fingers 29 and washers 30 and end washers 30A are fitted to the rod 28 prior to the rods insertion in the lower socket member 25, and the bore 37 of the upper member 25 is closed by insertion of the plug 27 which can be a press fit in the bore 37 or alternatively can be fused to the member 25. As can be seen in FIG. 1, the wiper assemblies 4 have a staggered axial and circumferential relationship so that the portion of wall 5 adjacent heating jacket 9 is completely and effectively wiped.

Figure 5:
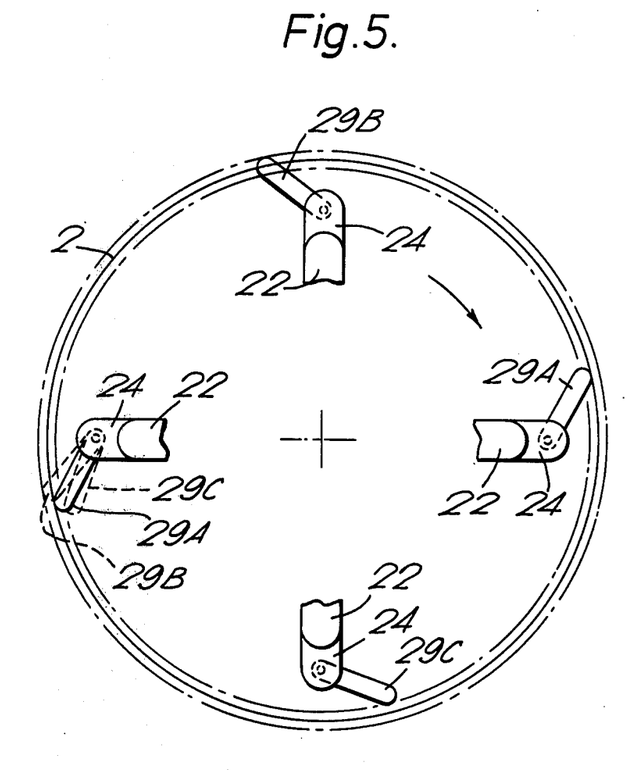
FIG. 5 is a schematic plan view of the evaporator, with a modified form of wiper element tip, and showing the movements of the wiper elements.

The glassing of the internal wall 5 of the vessel which involves a series of firing operations inevitably results in irregularities in the geometry of the vessel; in particular there occurs out-of-roundness distortion (FIG. 3) as indicated by a transverse section of the vessel and axial straightness distortion as indicated by a longitudinal section of the vessel (FIG. 1). It is a particular feature of the present evaporator that these distortions are catered for by the wiper assemblies 4. Referring to FIG. 5, the wiper assemblies 4 are so arranged that the elements 29 adopt a trailing configuration relative to the vessel 2 and the elements 29 which are urged into contact with the wall 5 by centrifugal force pivot to cater for out-of-roundness of the wall 5. Element 29A is in the normal position in FIG. 5 while elements 29B and 29C have pivoted to cater for maximum distortion on either side of the nominal radius, 29B to a maximum radius and 29C to a minimum radius. The pivotal elements 29 also permit discrepencies in the radial lengths of arms 22. The out-of-roundness distortion may be as much as 3% of the vessel's diameter. Straightness distortion is catered for by pivoting of the elements 29 of each assembly 4 relative to each other. The number of elements 29 in each assembly 4 can vary but will be dependent on the particular application of the evaporator and especially on the particular process requirements, e.g., the chemical being processed with the degree of wiping to give good evaporation.

The inlet feed system 6 includes a rotary distributor as described and claimed in U.S. patent application No. 808,118 filed June 20, 1977 by E. Nunlist and J. Mitchell and entitled "Feed Distributor for Glassed Steel Wiped Evaporator." The feed system 6 includes an annular open-topped housing 40 surrounding the shaft 17 and resting on the upper radial arms 22 of the uppermost wiper assembly 4 and on a shorter pair of radial arms 42. The housing 40 is machined from a fluorocarbon block, such as P.T.F.E., and is clamped to the arms 22, 42 by means of a pair of P.T.F.E. half-rings 43, P.T.F.E.

screws 44 linking the half-ring 43 and the housing 40. The housing 40 provides an annular chamber 45, and an inlet pipe 41 (FIG. 1) supplies liquid to be evaporated to the chamber 45.

An opposed pair of tubular conduits 46 of P.T.F.E. are screwed into bores 47 in the peripheral wall of the housing 40 and extend radially so that their outer ends lie closely adjacent the inner wall 5 of the vessel. Support plugs 48 resting in the upper sockets 25 serve for outer support of the conduits 46. The housing 40 has an inwardly inclined lip 49 to preclude splashing. The outer ends of the conduits 46 are of open-topped trough form 50: this form of conduit enables the feed system to handle particulate material.

In operation of the feed system, the rotating conduits 46 discharge the liquid on to the vessel wall 5 ahead of the uppermost blade assembly, by means of centrifugal force. It would be possible to have the conduits 46 inclined downwardly slightly so that liquid discharge is assisted by gravity. Additionally the housing 40 could be supported by the shaft 17 clear of the uppermost wiper assembly 4 and the conduits 46 could wholly comprise open-topped troughs.

Figure 9:
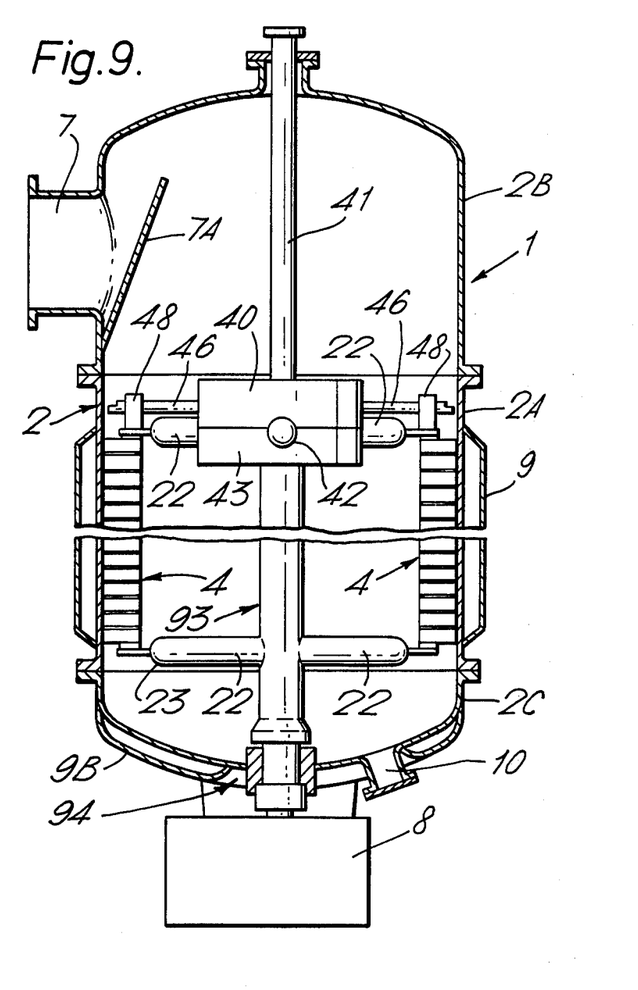
FIG. 9 shows a cross-sectional elevation of a wiped film evaporator according to a second embodiment of the present invention.

In the modification shown in FIG. 9, the inlet feed system 6 comprises at least one feed tray 60 (two diametrically opposed trays are used in this embodiment) with the inlet pipe 41 discharging on to the tray 60 so as to mitigate splashing. The tray 60 which includes a base 62 and a peripheral wall 63 can be made of P.T.F.E., and a pair of steel support arms 64 carry the tray 60. The inner wall-facing edge 65 of the tray is profiled complementary to the wall 5 but has a portion spaced from the wall 5 to provide a liquid feed gap G. The portions of the steel support arms 64 within the vessel 2 are glass lined to resist corrosive attack, and it is a feature of the trays and support arms that they are removable from the vessel wall for repair. Specifically, the arms 64 are secured externally of the vessel to satisfy the design limitations resulting from the internal glassing. The tray 60 can be secured by pin or pins 49 which can be of suitable plastics material.

In the embodiment shown in FIG. 9, the rotor assembly 93 is upstanding from the bottom 2C of the vessel and is supported at the bottom in a suitably externally located thrust and journal bearing assembly 94, the upper end of the rotor assembly 93 being free within the vessel 2. Additionally, the motor 8 for the rotor assembly 93 is located below the vessel 2. Otherwise, like parts of the evaporator of FIG. 9 have the same reference numerals as in FIG. 1. The distributor 40 is located at the upper free end of the rotor assembly and is substantially similar to the distributor of the FIG. 1 embodiment: again the distributor is carried by the arms 22 (and 42). However, the housing 40 can be substantially cup-shaped, with the inlet feed pipe 41 discharging into the centre of the cup. Although it would be possible to have a top located axial outlet with demister elements to block liquid particle passage.

It is advantageous that the vapour discharge 7 is located transversely to the evaporator since this conveniences the positioning of a baffle (7A) to block the passage of liquid particles to the discharge. However, with the rotor supported in an upper external bearing as in the FIG. 1 arrangement, extra length of shafting is required for the distance between the upper bearing and the upper wiper assembly, i.e., the rotor 3 has a non-supporting portion extending passed outlet 7. The FIG. 10 arrangement has the advantage of eliminating this extra shafting length, and this enables considerable economies to be achieved. Additionally, the arrangement and installation of the rotary distributor 6 is made simpler and more satisfactory, particularly since a central through-bored hub is not required in the housing 40. The liquid outlet 10 is now axially off-set.

It is a feature of the above evaporators according to the present invention that the feed system 6 and also the rotor and wiper assemblies can be separated from the vessel to permit convenient repair where necessary, e.g., by re-glassing, and it is also possible to repair or replace the wiper assemblies in situ within the vessel.

By the internal arrangement of the above evaporator, the glassing of the various evaporator parts can be readily achieved, which is advantageous to facilitate the production of a complete evaporator with glass lined internal parts, which evaporator can be satsifactorily used in chemical processes.

The glass lining in both embodiments can be of an acid/alkali corrosion resistant borosilicate glass and the lining preferably has a minimum thickness, for example, 1 mm. The above described evaporators according to the present invention should find particular use in the chemical industry, where corrosive liquids are encountered, but it is envisaged that they would also be useful in hygenic applications (e.g., food industry) since there will be no metallic pick-up by the P.T.F.E. wipers due to their running on glass. In comparison with previous evaporators for use with corrosive liquids it is believed that the above evaporators according to the present invention will have a considerably longer life. The parts within the evaporator do not require to be made of expensive corrosion resistant material, and the number of radial wiper supporting arms can be reduced in comparison with previous arrangements.

Modifications are of course possible in the design. For example, the ends of arms 22 could be provided with a more tapering configuration as they blend to the portions 24.

We claim:

1. A wiped-film evaporator for corrosive liquids, said wiped-film evaporator comprising,
    (i) a vertically oriented cylindrical vessel, having a substantially smooth contoured inner surface, and having a corrosion resistant glass lining on said inner surface;
    (ii) rotary shaft means within the vessel supported in bearing means and connectible to a drive, said rotary shaft means having a corrosion resistant lining on the external surface thereof;
    (iii) an inlet for delivery of liquid to be evaporated into the cylindrical vessel;
    (iv) an outlet for vapour;
    (v) corrosion resistant wiping means for wiping the internal surface of the cylindrical vessel for the formation of a liquid film on the internal surface, said wiping means including a plurality of wiping units each wiping unit including a series of vertically stacked side-by-side wiping elements each of relatively small vertical extent and each pivotally mounted on a vertical spindle so as to adopt in use a trailing configuration relative to a radius of the vessel passing through the centre line of the spindle; and
    (vi) A plurality of wiper support means carried by the rotary shaft means, each wiper support means comprising a pair of axially-spaced radially-extending support members, mounting means being provided on the support members for support of one of said wiping units between the support members, said mounting means including socket devices receiving said vertical spindle of the wiping unit;

(vii) each wiping element engaging the internal surface of the vessel to wipe a narrow annular strip on said internal surface and each element being individually pivotal whereby each wiping unit can cater for irregularities in the roundness and straightness of the portion of said internal surface wiped by the wiping unit.

2. The evaporator according to claim 1, wherein the bearing means for the rotary shaft means are located outwith the cylindrical vessel.

3. The evaporator according to claim 2, wherein one of the ends of the rotary shaft means is free within the vessel.

4. The evaporator according to claim 3, wherein support means are provided for the rotary shaft means at the upper end of the shaft means, said rotary shaft means being hung within the vessel by said support means with the lower end of the rotary shaft means free within the cylindrical vessel.

5. The evaporator according to claim 3, wherein support means are provided for the shaft means at the lower end of the shaft means, said shaft means being upstanding within the vessel with the upper end of the shaft means free within the vessel.

6. The evaporator according to claim 5, wherein said inlet for delivery of liquid includes corrosion resistant liquid distributor means mounted on said rotary shaft means at the upper free end of said shaft means, said corrosion resistant liquid distributor means serving to spread liquid on the internal surface of the cylindrical vessel.

7. The evaporator according to claim 1, wherein each radial support member includes a through bore at its outer end, and the respective socket device has an axial body portion insertable into said through-bore and a shoulder portion engageable with the support member to locate the socket device.

8. The evaporator according to claim 1, wherein said inlet for delivery of liquid includes corrosion resistant liquid distributor means located above said wiping means, said corrosion resistant liquid distributor means serving to spread liquid on the internal surface of the cylindrical vessel.

9. The evaporator according to claim 8, wherein the liquid distributor means comprises a plurality of trays, each located closely adjacent the internal surface of the cylindrical vessel so as to provide a discharge clearance with said internal surface, and support members for the trays extending through the wall of the vessel.

10. The evaporator according to claim 1, wherein the cylindrical vessel comprises a main cylindrical portion the inner surface of which is wiped by said wiping means, and end cap portions joined to said main portion by sealing connections.

11. The evaporator according to claim 1, wherein the wiping units are staggered axially and circumfrentially.

12. The evaporator according to claim 1, wherein the wiper elements are made from a corrosion resistant fluorocarbon.

13. The evaporator according to claim 12, wherein the wiper elements are made from polytetrafluoroethylene (P.T.F.E.).

14. The evaporator according to claim 1, wherein the socket devices are made from a fluorocarbon.

15. The evaporator according to claim 1, wherein the spindle is a corrosion resistant glass lined metallic rod.

16. The evaporator according to claim 1, wherein the rotary shaft means and the support means have a corrosion resistant glass lining thereon.

* * * * *